Nov. 21, 1944.         C. LANGBERG         2,363,427
OPTICAL DEVICE FOR VIEWING PHOTOGRAPHIC IMAGES
Filed Jan. 19, 1942
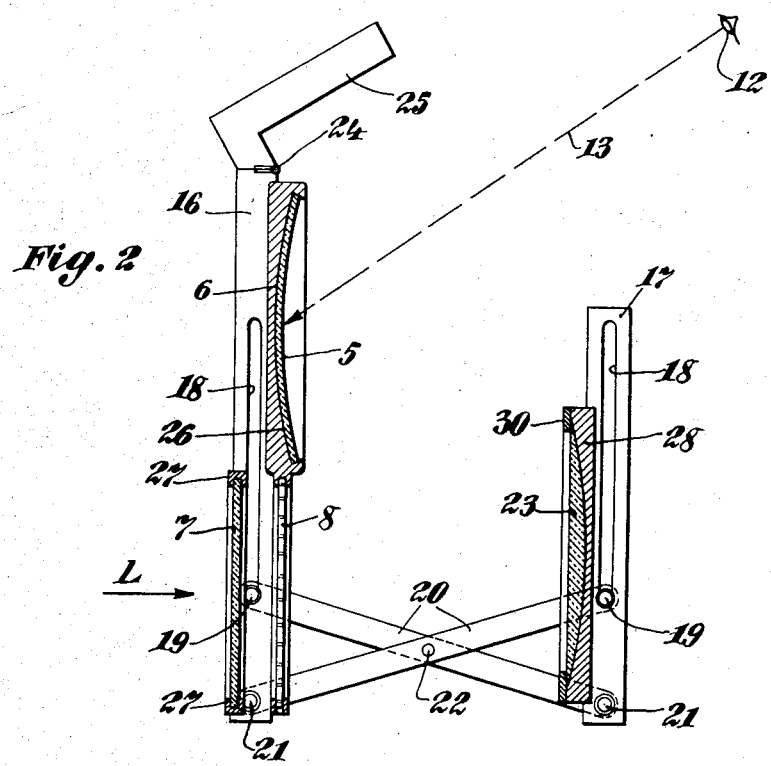
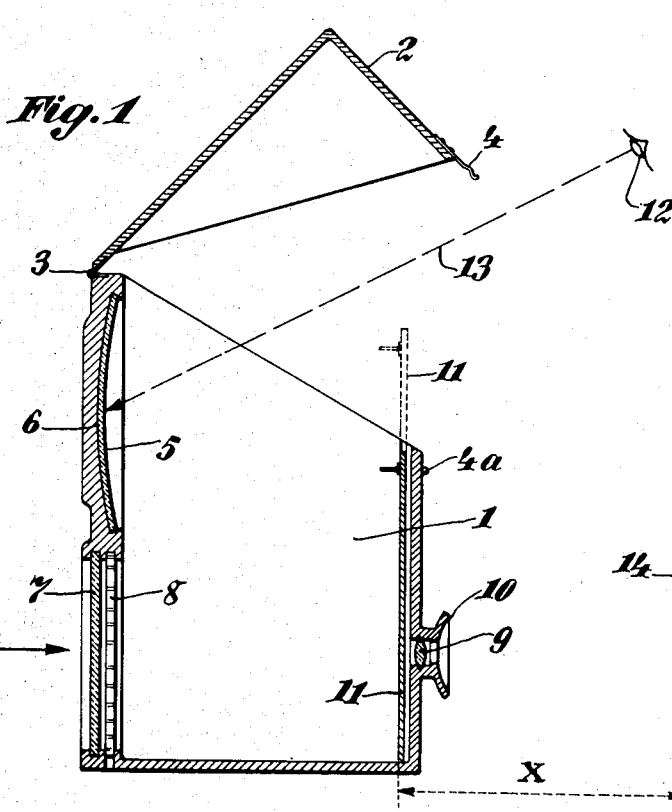
INVENTOR.
Charles Langberg,
Darby & Darby
ATTORNEYS.

UNITED STATES PATENT OFFICE 2,363,427

OPTICAL DEVICE FOR VIEWING PHOTOGRAPHIC IMAGES

Charles Langberg, New York, N. Y.

Application January 19, 1942, Serial No. 427,270

1 Claim. (Cl. 88—74)

The present invention relates to an optical device by means of which photographic images and particularly "Kodachrome" transparencies and the like may be enlarged and viewed or examined. More particularly still the invention relates to a device of the class described which is so small that it may readily be carried, for example in a man's pocket.

A number of attempts have been made to construct devices adapted to the viewing of "Kodachrome" transparencies and the like but these attempts have been uniformly unsuccessful since all the devices have been either bulky or incapable of giving sufficient enlargement to be satisfactory to the user.

Further, many of the devices have been extremely expensive and therefore not available to the general public. Another objection to the previously available devices of the class mentioned has been the fact that all, or nearly all, of them required a special light source.

In the past when viewing prints or transparencies in a concave mirror, the print or transparency was necessarily held in a position in front of the mirror which resulted when the mirror was held in the observer's hand in having the picture or transparency between the observer's body and the mirror. In my device by utilizing two mirrors, it is possible for the print or transparency to be in a position substantially in the plane of the one mirror and for the second mirror to occupy the position which formerly was occupied by the transparency. Thus the effective distance of the image reflected in the first mirror is greatly increased thereby resulting in increase of magnification without corresponding increase of distance between the first mirror and the slide or photoprint and, furthermore, it is possible to use light sources which are independent of the device since, as has been explained, the observer's position is not such as to block normal daylight or normal artificial light.

In addition the use of concave mirrors is beneficial since it prevents detrimental chromatic defects and results in producing a relief effect from the "Kodachrome" or other slides. In fact the impression gained by the observer is that of observing a "Kodachrome" slide of comparatively great size rather than that of observing a magnified image this being due to the fact that the concave mirrors do not produce glare nor disturbed reflection such as is prevalent on lens surfaces.

The device of my invention comprises a compact, inexpensive transparency viewer which provides an extremely great enlargement when the size of the instrument is taken into consideration. In general my invention comprises a shallow box-like structure with an aperture therein in which the slide or film transparency to be viewed may be inserted. This box is so constructed that light from any source, as for example daylight, may be utilized. The light passes through the photographic film image and forms an imake of the picture thereon upon a mirror (which may be either plane or convex and may form an image either unmagnified or magnified). A second mirror located on the wall of the device in which the aperture above mentioned is also located, reflects the image from the first mirror to a position such that it may be readily observed. The second mirror is a magnifying mirror and it alone or in conjunction with the first mirror, if that also is a magnifying mirror, serves to produce a greatly enlarged image of the picture present upon the slide or transparency.

It is thus an object of my invention to produce an optical device for observing film transparencies and the like which shall be inexpensive to manufacture while at the same time capable of producing a high degree of magnification.

It is another object of my invention to produce such a device which may be folded in order that it may be carried even more readily and which may be adjusted to give varying degrees of magnification.

It is another object of my invention to produce a device for observing film transparencies in which the mirror arrangement above described may be utilized or in the alternative, an objective lens may be used for direct viewing of the illuminated transparency.

It is a further object of my invention to produce a device of the class described in which the mirrors utilized may be of molded rather than of ground glass and yet the distortion normally produced by such mirrors may be corrected.

It is a still further object of my invention to provide a relief effect and give depth of vision to the image of the picture viewed.

Other objects and features of the invention will appear when the following specification is considered in connection with the appended drawing in which Figure 1 is a vertical cross-section view of one embodiment of my invention, and Figure 2 is a view, partly in elevation and partly in vertical cross-section of a second form of my invention, this form including means for folding the box-like structure in order that it may be even more compact than is the structure of Figure 1.

Referring now to Figure 1, there is shown at 1 a rectangular box-like structure having a cover 2 hinged to the rearward wall thereof at 3, the cover and front wall of the box being provided with cooperating latch members at 4 and 4a. Near the top of the rear wall of box 1 there is a concave mirror 6 which may be of molded glass (commonly known as a "commercial magnifier") and which is silvered on its outer face as indicated at 5. Beneath this mirror there is an aperture of substantially the size of the normal cardboard mounting in which "Kodachrome" transparencies are supplied to the public. This aperture has channel members on the top and two sides thereof so that it is possible to insert a slide into position in the aperture as shown at 8. Fixed permanently within the aperture as indicated at 7 is a ground glass which serves to diffuse the light prior to its transmission through the slide from the rear of the device (from the left as seen in Figure 1). The path of the light toward the instrument is indicated by the arrow designated L.

Adjacent the forward wall of the box 1 and fixed in position in any suitable manner, as for example in grooves formed in the side walls of the box, is a plane mirror 11. Due to the positioning of this mirror in the grooves mentioned, it will be possible to move the mirror upwardly as shown by the dotted lines in Figure 1 until it is out of the path of vision from the objective lens 9 which is fixed in an aperture in the front wall of the box 1 and supplied with an eyepiece shown at 10. It will be seen that when desirable the slide 8 may be viewed from the eyepiece 10 and lens 9, the only magnification in this instance being that brought about by the lens 9.

When the mirror 11 is in its lower position, as shown in Figure 1, an image of the slide 8 is formed at a distance X to the right of mirror 11 equal to the distance of the slide to the left of mirror 11. This image of the slide will in this instance be of approximately the same size as the original slide but it will be obvious as the description proceeds that a concave mirror may be utilized whereby the image will be enlarged. Whether enlarged or not, the image, formed at a point such as 14, will be reflected into the concave mirror 6 and may be viewed by an observer along such a line as that indicated at 13, the observer's eye being necessarily at a position such as 12. The amount of magnification will obviously depend to some extent upon the distance between the observer's eye and the mirror 6 but this magnification will always be limited by the size of the mirror 6. However, if it is desired to look at only a small portion of the slide then it is possible to keep only that portion within the confines of the mirror 6 and consequently to procure a very much greater enlargement of that particular portion than can be procured while the entire photographic likeness is being observed.

It will be seen that by the use of the two mirrors, it is possible to make the box 1 much shallower than would be the case if a single mirror were utilized since if this were done the slide itself would necessarily be positioned at 14 wherefore the box would have to be of twice the depth which I employ. In fact the depth of the box in the present device is about 2 inches and thus it may be carried in a pocket or the like. Due to this combination of mirrors, furthermore, it is unnecessary to utilize a special light source although this has been necessary in the past. In devices utilizing a single mirror (whether magnifying or not) one observing the image in a mirror such as 6 would necessarily be in such a position as to block with his body all transmission of light through the slide to the mirror when the slide was placed in a position such as 14. In this connection, it may be stated that the box of Figure 1 is somewhat enlarged and that its actual size is even smaller than is shown in the figure. Obviously the box 1 may be used for transportation and storage of slides or other items when not in use as a viewer.

The invention disclosed hereinabove may, of course, be embodied in many forms and a second form thereof is shown by way of example in Figure 2. In this embodiment of the invention a framework comprising side rails 16 and 17 is provided, the rails 16 being longer than rails 17. A member 25 (shown in side elevation) is hinged on a pin 24 which extends between side rails 16 at the top thereof so that when the member 25 is rotated clockwise into position its lower edge will abut the upper edge of member 28 so that the entire device may be enclosed. The side rails 16 and 17 are provided with slots 18 in which pins 19, extending outwardly from the upper arms of links 20 of a pantagraph arrangement, ride. The lower arms of the links 20 are pivoted at points 21 to the side rails 16 and 17 and the two pantagraph links at each side of the device are pivoted at the central point 22. It will be seen that with this arrangement, the two rails 16 and 17 may be moved together so that the instrument may be placed in a very compact form for carrying.

A concave mirror 6 exactly similar to that of Figure 1 and having a silvered exterior surface 5 likewise similar to that of Figure 1, is mounted in any suitable manner as for example in a backing member such as that shown at 26, this member being in turn mounted on and extending between said rails 16. The member 26 extends downwardly and beneath the mirror 6 has an aperture therein formed with grooved top and side to receive a slide inserted from the bottom, such a slide being shown in position in Figure 2 and indicated by the numeral 8. Also extending between the side rails 16 near the bottom thereof is a pair of channels 27 having mounted therein a ground glass 7 exactly similar to that of Figure 1 and used for the same purpose, i. e., to diffuse the light falling on slide or transparency 8.

Mounted on the forward pair of side rails 17 and extending between them is a mirror 23, the mounting in this instance comprising a plastic or like back 28 against which the mirror is held by means of the annular ring 30 affixed to the backing 28. The mirror 23 is silvered on its rear or right hand surface (Fig. 2) and thus although the forward or left hand surface is plane, the mirror 23 is actually a concave mirror and serves to produce a magnified image of the slide 8. In this connection it should be noted that a mirror such as that described may be substituted for the mirror 11 of Figure 1 or that a plane mirror such as 11 may replace mirror 23.

In the same manner as has been previously described in connection with Figure 1, light emanating from any source will pass through the ground glass 7 and slide 8 and will fall upon the mirror 23 forming, in this instance, a magnified image of the slide. An observer looking in the mirrer 6 will see, since this mirror is likewise concave, a magnified image of the already magnified image and thus will be enabled to view the original slide 8 in a much enlarged form.

Although as has previously been mentioned, the two mirrors 6 and 23 may be molded and consequently subject to the production of distortion due to the distortion of their surfaces invariably produced by cooling this is of no importance since when two such mirrors are used they may be rotated until the distortion produced by one is compensated by the distortion produced by the other. This is always possible due to the fact that the image distortion resulting from the surface distortion produced by cooling is always along one axis only and consequently by placing the distortion axes at right angles to each other the resultant distortion is minimized if not completely eliminated.

Both devices as shown may be subject to slight amount of "Keystone distortion" but this may readily be avoided by simply inclining the slide mounting channels at a slight angle to the vertical.

The device of Figure 2 has the advantage of extreme compactness but as shown in Figure 2 is subject to the disadvantage that random light rays may enter from the sides since the box structure is not complete. However, this disadvantage may readily be obviated by using bellows extending from front to rear on both sides of the device. In both embodiments of the invention, it will be noted that a cover (2 or 25) is so positioned when the instrument is in use that it serves to prevent random light rays from entering the device from the top and further serves to shade the eyes of the observer from light rays emanating from whatever source may be utilized to illuminate the slide 8.

While I have described preferred embodiments of my invention, it will be apparent that many other forms of the invention might be devised without departing from the spirit or the principle thereof. For this reason the scope of the invention is to be determined solely by the appended claim and not by the foregoing description.

What I claim is:

In a pocket type slide viewer, in combination, a framework comprising two elements spaced apart, pantagraph linkages connecting said elements, a concave magnifying mirror mounted on one element of said framework, a slide receptacle also mounted on said element, substantially in the plane of said mirror, a light diffusing element mounted on said frame element in a line with and behind said slide receptacle, a second concave magnifying mirror mounted in the second element of said framework in a plane substantially parallel to that of the said first mirror, and in alignment with said slide receptacle and diffusing element, said pantagraph linkages serving to make the structure foldable and serving likewise to make the distance between said frame elements adjustable whereby the images produced by transmission of light through said diffusing element and slide in said slide receptacle may be variously magnified.

CHARLES LANGBERG.